J. W. BASSHAM.
SPRING TIRE.
APPLICATION FILED FEB. 11, 1920.
1,344,974.
Patented June 29, 1920.
2 SHEETS—SHEET 1.
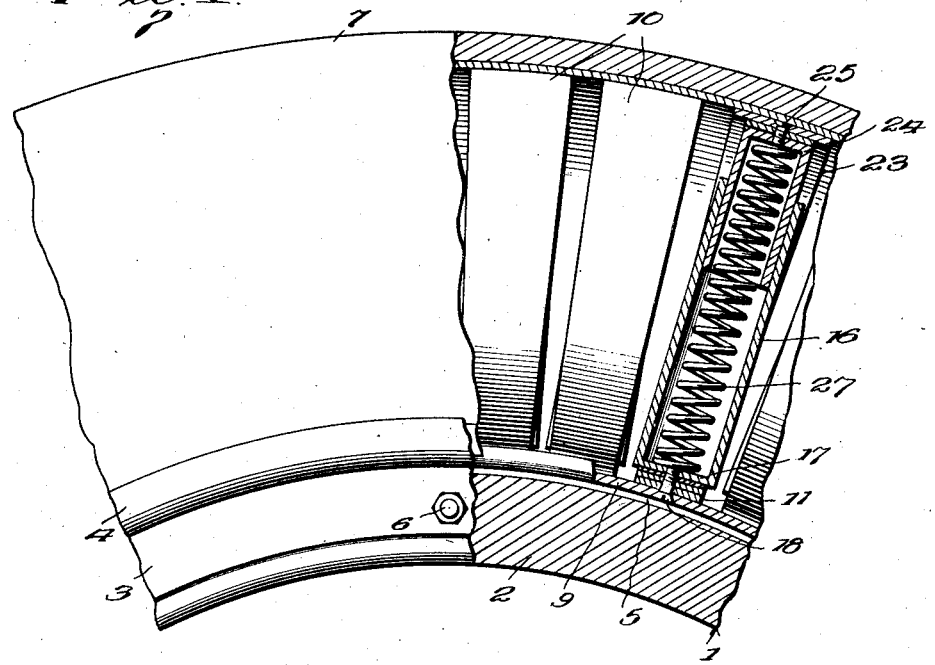
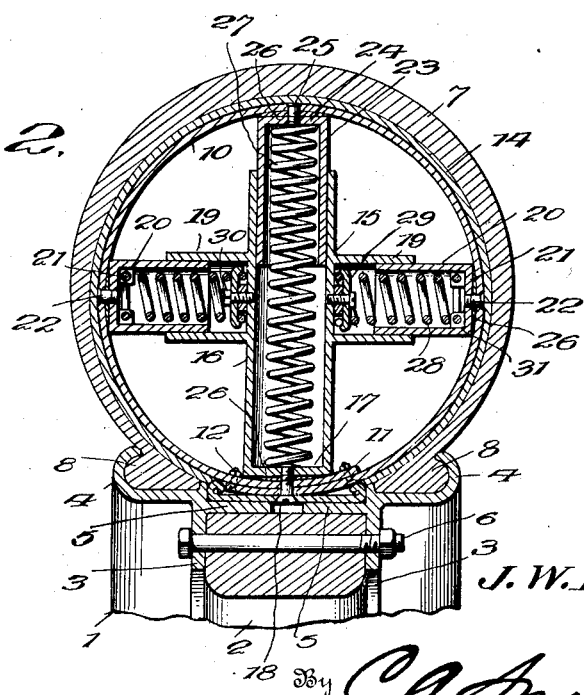
Inventor
J. W. Bassham,
By C. A. Snow & Co.
Attorneys J. W. BASSHAM.
SPRING TIRE.
APPLICATION FILED FEB. 11, 1920.
1,344,974.
Patented June 29, 1920.
2 SHEETS—SHEET 2.
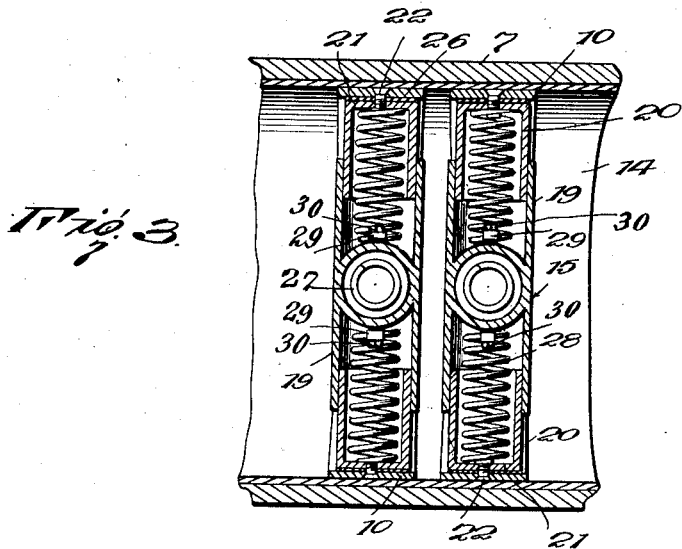
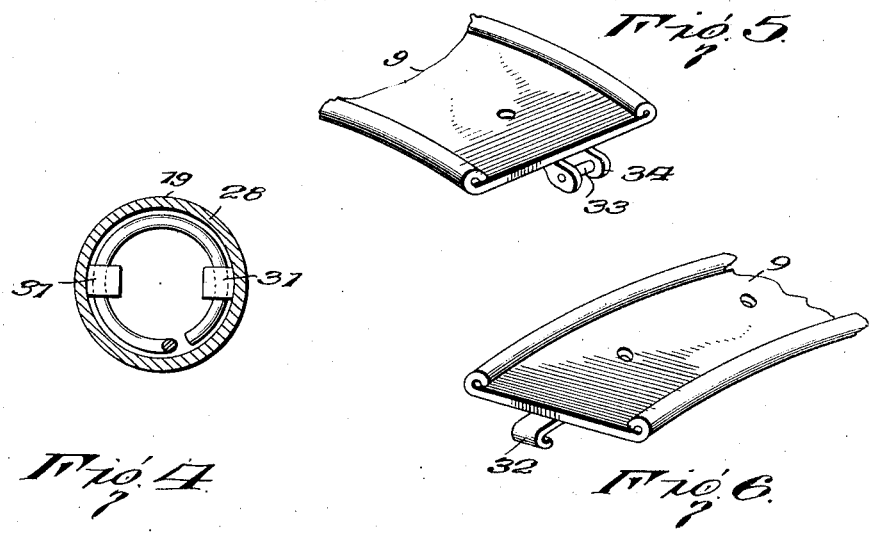
Inventor
J. W. Bassham,
By C. A. Snow & Co
Attorneys

UNITED STATES PATENT OFFICE.

JOHN W. BASSHAM, OF COLUMBIA, TENNESSEE.

SPRING-TIRE.

1,344,974.

Specification of Letters Patent. Patented June 29, 1920.

Application filed February 11, 1920. Serial No. 357,862.

*To all whom it may concern:*

Be it known that I, JOHN W. BASSHAM, a citizen of the United States, residing at Columbia, in the county of Maury and State of Tennessee, have invented a new and useful Spring-Tire, of which the following is a specification.

The device forming the subject matter of this application is a spring tire, and one object of the invention is to provide a tire wherein pneumatic elements subject to puncture and deterioration may be dispensed with.

Another object of the invention is to improve the spring construction whereby the resiliency in the tire is afforded.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention, parts being broken away; Fig. 2 is a transverse section of the structure shown in Fig. 1; Fig. 3 is a horizontal section taken through the tire at right angles to the median plane thereof; Fig. 4 is a fragmental sectional view showing the means whereby the ends of certain of the springs are secured; and Figs. 5 and 6 are perspective views disclosing portions of the base member.

In the accompanying drawing, the numeral 1 designates a wheel body including a felly 2. Side plates 3 coöperate with the felly 2 and include clencher flanges 4. The side plates 3 have wings 5 engaging the outer curve of the felly 2, the side plates being held to the felly by securing elements 6. A casing 7 is provided, the same having clencher beads 8 coöperating with the clencher flanges 4. A base member in the form of a ring 9 extends circumferentially of the wheel and rests upon the wings 5 of the side plates 3, the base member preferably being made of metal.

Resilient rings 10 are disposed transversely of the base member 9. The ends of the strips out of which the rings 10 are fashioned are overlapped as shown at 11, and are connected by securing elements 12. The rings 10 ordinarily are made of spring metal, a shield 14, of canvas, leather or the like, being interposed between the rings 10 and the casing 7, to prevent wear upon the latter. Cruciform frames 15 are located within the rings 10. Each frame 15 comprises a tubular body 16 disposed in the median plane of the tire, the body 16 having an inner end 17. A securing device 18 passes through the base member 9 and the overlapped ends 11 of the rings 10, the securing device 18 engaging the inner end 17 of the body 16 of the cruciform frame 15. The cruciform frame 15 comprises lateral arms 19 projecting from the body 16. Tubular followers 20 are mounted to reciprocate in the arms 19, the followers 20 having outer ends 21 attached by securing elements 22 to the ring 10. A follower 23 is mounted to reciprocate in the outer end of the tubular body 16 on the frame 15 and has an outer end 24 attached by a securing element 25 to the tread portion of the ring. If desired, fillers 26 may be interposed between the outer ends of the followers 20 and 23 and the ring 10, a filler being interposed between the inner end of the body 16 of the frame 15 and the overlapped ends 11 of the ring 10.

A compression spring 27 is located in the tubular body 16, one end of the compression spring abutting against the end 17 of the body, and the other end of the compression spring abuting against the end 24 of the follower 23. Springs 28 are located in the lateral arms 19 of the frame 15 and in the followers 20. The inner ends of the springs 28 are connected by caps 29 and fastening devices 30 to the body portion 16 of the frame 15. The outer ends of the spring 28 may be connected with the followers 20 in any desired way. If preferred the followers 20 may have ears 31, through which the outer convolutions of the spring 28 are threaded.

In order to facilitate the assembly of the base member 9 with the felly 2, it may be expedient to fashion the base member in sections, one end of each section having a hook 32 adapted to coöperate with a pin 33 carried by projections 34 on the adjoining end of another section. When the hooks 32 are assembled with the pins 33, the ends of the sections of the base member will abut, like a rule-joint, thus affording a relatively rigid and secure construction, when the base member is in place on the felly 2 or, more exactly speaking, on the parts 5, of the side plates 3.

In practical operation, considerable resiliency is afforded by the resilient rings 10. When the rings 10 are compressed, the springs 27 are compressed, the followers 23 moving inwardly. When the rings 10 are compressed, as aforesaid, the side portions of the rings tend to move outwardly, carrying with them the followers 20, the springs 28 being put under tension. The general construction of the device, as above described is such that a high degree of resiliency will be afforded, the device providing for a resiliency approaching that of a pneumatic tire, without the disadvantages commonly and properly attributed to a pneumatic tire.

Having thus described the invention, what is claimed is:—

1. In a device of the class described, a base member; resilient rings carried by the base member and disposed transversely thereof; frames in the rings; lateral followers slidable in the frames and cooperating with the sides of the rings; median followers slidable in the frames and coöperating with the tread portions of the rings; compression springs in the frames and supporting the median followers; and tension springs in the frames, the outer ends of the tension springs being attached to the lateral followers and the inner ends of the tension springs being attached to the frames.

2. In a device of the class described, a base member; resilient rings carried by the base member and disposed transversely thereof; frames in the rings; median compression springs in the frames and coöperating with the tread portions of the rings; lateral tension springs in the frames and having their inner ends secured to the frames; and means for securing the outer ends of the lateral springs to the side portions of the rings.

3. In a device of the class described, a base member; resilient rings carried by the base member and disposed transversely thereof; frames in the rings; lateral followers in the frames and coöperating with the sides of the rings; tension springs in the frames and secured at their inner ends to the frames, the outer ends of the springs being secured to the followers; and median compression springs in the frames, the outer ends of the compression springs coöperating with the tread portions of the rings.

4. In a device of the class described, a base member; resilient rings carried by the base member and disposed transversely thereof; frames in the rings; followers mounted to reciprocate in the frames and coöperating with the tread portions of the rings; compression springs in the frames and supporting the followers; lateral tension springs in the frames and having their inner ends secured to the frames; and means for securing the outer ends of the lateral springs to the side portions of the rings.

In testimony that I claim the foregoing as my own, I have hereto affixed my signature in the presence of two witnesses.

JOHN W. BASSHAM.

Witnesses:
  H. L. HENDLEY,
  LEX NICKS.